A. CHERNYSHOFF.
LIGHTNING ARRESTER.
APPLICATION FILED APR. 1, 1915.
1,211,822.
Patented Jan. 9, 1917.
2 SHEETS—SHEET 1.
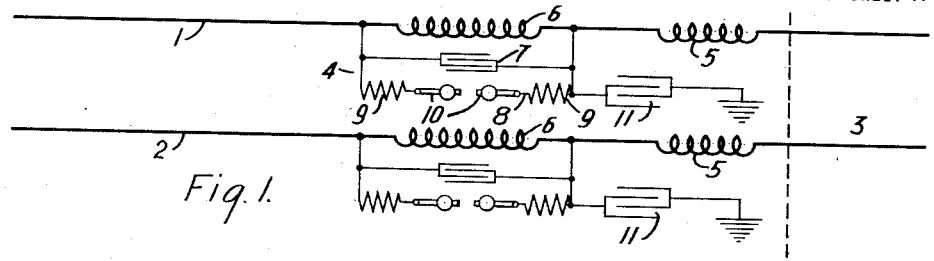
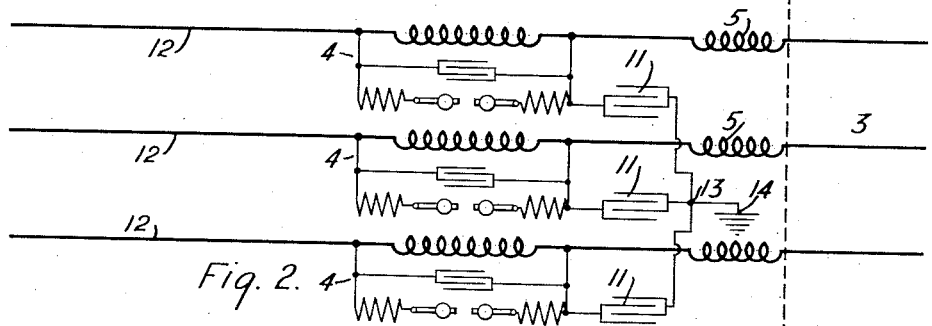
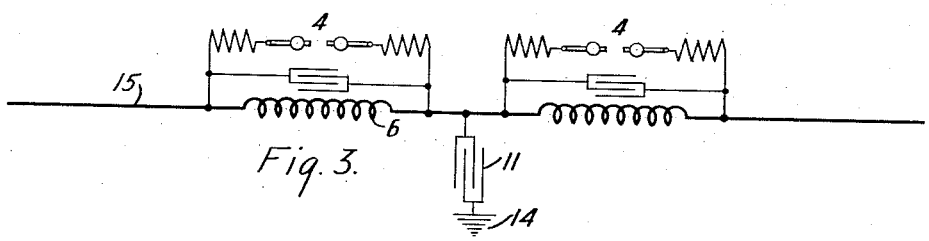
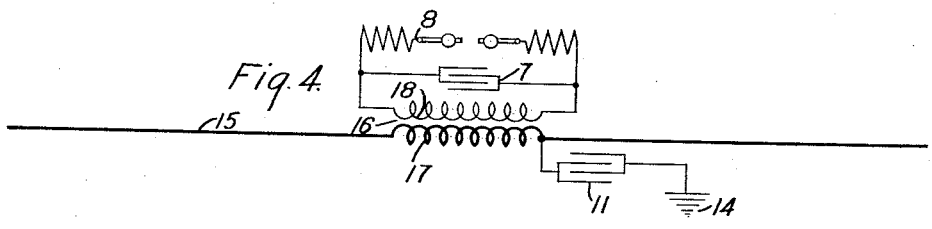
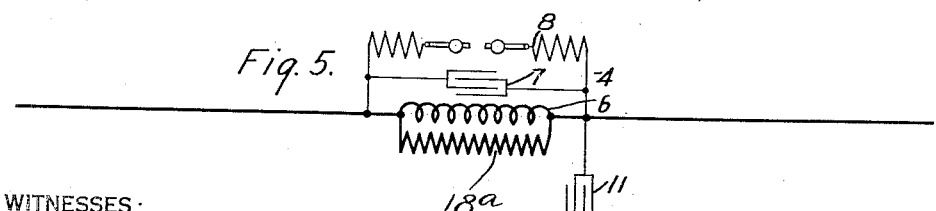
WITNESSES:
Fred A. Lind.
Geo. W. Hansen.
INVENTOR
Alexander Chernyshoff
BY
Wesley G. Carr
ATTORNEY A. CHERNYSHOFF.
LIGHTNING ARRESTER.
APPLICATION FILED APR. 1, 1915.
1,211,822.
Patented Jan. 9, 1917.
2 SHEETS—SHEET 2.
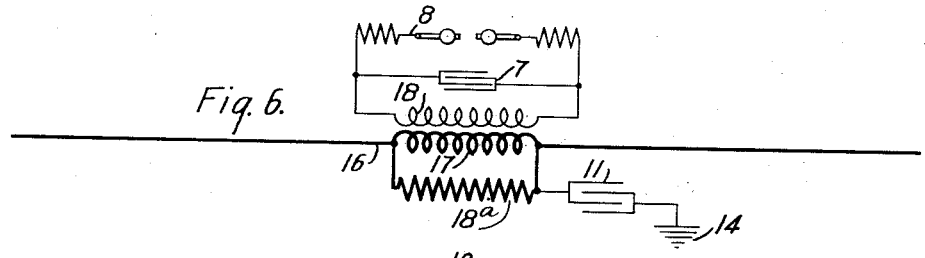
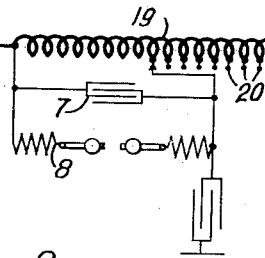
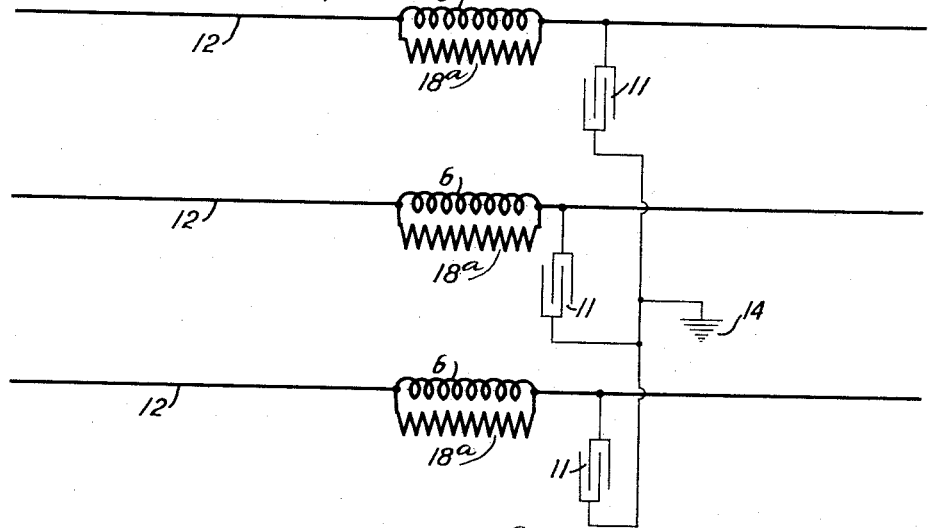
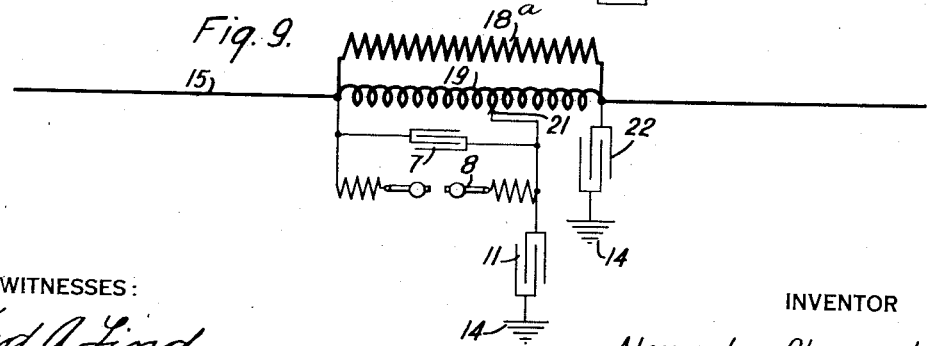
WITNESSES:
Fred. A. Lind.
Geo. W. Hansen.
INVENTOR
Alexander Chernyshoff
BY
Chesley G. Carr
ATTORNEY

UNITED STATES PATENT OFFICE.

ALEXANDER CHERNYSHOFF, OF SWISSVALE, PENNSYLVANIA, ASSIGNOR TO WESTINGHOUSE ELECTRIC AND MANUFACTURING COMPANY, A CORPORATION OF PENNSYLVANIA.

LIGHTNING-ARRESTER.

1,211,822.  Specification of Letters Patent.  Patented Jan. 9, 1917.

Application filed April 1, 1915. Serial No. 18,512.

*To all whom it may concern:*

Be it known that I, ALEXANDER CHERNYSHOFF, a subject of the Czar of Russia, and a resident of Swissvale, in the county of Allegheny and State of Pennsylvania, have invented a new and useful Improvement in Lightning-Arresters, of which the following is a specification.

My invention relates to devices employed for protecting electrical circuits from disturbances arising from lightning, static discharges, etc., that are accompanied by excessive pressures or by the flow of high frequency currents.

More particularly, my invention relates to lightning arresters which are connected to electrical circuits in order to dissipate the energy of such disturbances and to afford protection to the electrical apparatus connected in circuit.

A lightning arrester, to be most effective in suppressing any disturbances that may injure the electrical equipment of a system, should decrease the amplitudes and the potential gradients of the disturbing waves and dissipate the excess energy stored in them. If the amplitudes and periods of the disturbing waves are decreased below certain values, the strains imposed upon the insulated windings subjected to these disturbing waves will be distributed over their entire length and, therefore, no adjacent points of extreme difference of potential will exist therein.

By means of my present invention, I utilize concentrated capacity, concentrated resistance, concentrated inductance, and ground connections to comprise the elements of a lightning arrester. Again, I so assemble these elements in such relationship to one another that the amplitudes and potential gradients of the disturbing waves are substantially decreased and, at the same time, large portions of the excess energy of the disturbances are dissipated. As a result, I provide a protective device for electrical circuits which will be particularly efficient in limiting to safe values the strains imposed upon the electrical apparatus connected therein. At the same time, the line conductors of the circuits will be relieved of excessive strain occasioned by the disturbing waves and the excess energy stored in the disturbances.

For a better understanding of the nature and scope of my invention, reference may now be had to the following description and the accompanying drawings in which—

Figure 1 is a diagrammatic view of a transmission circuit which comprises two conductors, each being equipped with a protective device embodying a form of my invention; Fig. 2 is a diagrammatic view of a three-phase transmission circuit equipped with my lightning arresters; Fig. 3 is a diagrammatic view of my lightning arrester as employed on a conductor in order to offer protection from disturbances flowing along the line in both directions; Figs. 4, 5, 6, 7 and 9 are modified forms of lightning arresters constructed in accordance with my invention, and Fig. 8 is a modified form of my lightning arrester connected to a three-phase transmission circuit.

Referring to Fig. 1, line conductors 1 and 2, extending from a power house or sub-station represented at 3, are afforded protection by protective devices 4. It is usual, and in accordance with the best practice, to insert in each line conductor a choke coil 5 immediately adjacent to the power house 3. Inasmuch as both of the line conductors 1 and 2 are equipped with similar protective devices 4, I will describe in detail only one of them. Each lighting arrester 4 comprises an inductive device 6 which is connected in series circuit with its respective line conductor. A condenser 7 is connected in shunt to the inductive device 6, and, similarly, a subsidiary circuit 8 is connected across the condenser 7. The subsidiary circuit 8 comprises energy-consuming devices; for instance, non-inductive resistances 9 and adjustable spaced spark-gap members 10. The arrester 4, so far as explained, is very similar to that disclosed in my copending application, Serial No. 861,142, filed Sept. 10, 1914, and assigned to the Westinghouse Electric and Mfg. Company. In the above-mentioned patent application, however, I have used a series transformer comprising primary and secondary coils in lieu of the inductive device 6 of the present invention. Consequently, the action of the protective device herein described is somewhat modified from that of the arrester previously disclosed. Of course, the electrical constants of the elements comprising the subsidiary circuit 8 are so selected and so related to one another as to establish a circuit having a natural period of vibration which is of an extremely high frequency. A second condenser 11, which is inserted between the inductive device 6 and the choke coil 5, or more particularly on the power-house side of the device 4, is connected between ground and the inductive device 6, the condenser 7, and the subsidiary circuit 8. It is essential that the condenser 11 be connected between its respective line conductor and ground and it is also desirable to have it connected in series-circuit relationship with the first-mentioned condenser 7, as shown in the figure. It will be noted that each of the line conductors 1 and 2 is similarly connected to ground through the condensers 11, since it is highly undesirable to connect the lines 1 and 2 to each other by means of the condensers 11 because, the disturbances, occurring simultaneously on both of the line conductors, would render ineffective the action of any condenser so connected in circuit. For instance, condensers connected across the line conductors of a transmission line are ineffective in absorbing the charges of the disturbances because their terminals are maintained at substantially equal potentials at all times by reason of corresponding disturbances occurring simultaneously on all of the transmission conductors. Moreover, if resistors are connected in series with condensers so disposed, injury may be inflicted upon the electrical apparatus inasmuch as the resistors retard the absorptive quality of the condensers and also cause the disturbances to be reflected back upon the line conductors with no decrease in the amplitudes or potential gradients of the disturbing waves.

When high-frequency disturbances traverse conductors 1 and 2, they are precluded from flowing through the choke coils 6 because of their self inductance. However, the condensers 7 and 11 instantaneously absorb the energy of these disturbances, the condensers 7 subsequently dissipating the energy, which they previously absorbed, through the subsidiary or discharge circuits 8. By reason of the combination of the condensers 7, the resistors 9 and the spark-gap members 10, the discharge circuits 8 have natural periods of vibration which greatly exceed those of the disturbances the energy of which the said discharge circuits are designed to dissipate. As the condensers 7 discharge through the subsidiary circuits 8, the energy, initially absorbed by the condensers 7, is transformed into heat by means of the resistors 9 and the spark gaps formed by the spaced members 10. The condensers 11, which likewise have been charged to high potentials by reason of their simultaneous action with the condensers 7, discharge back to the line conductors and cause the energy, which they initially absorbed, to flow back into the transmission system. The wave forms of the energy flowing back from the condensers 11 are flattened considerably and of substantially low amplitudes. As these discharges are forced to flow through the inductive devices 5 and 6, the potential gradients of the waves are again decreased and a portion of the energy of the discharges is absorbed by the resistance of these devices. These portions of the disturbing waves which flow into the power house 3 are of low potential gradients and low amplitudes and, therefore, impose no serious strains upon the apparatus connected in circuit.

Extensive experiments have demonstrated the efficiency of my protective device in absorbing and dissipating the energy of high-frequency disturbances and its effectiveness in flattening out the disturbing wave forms, thereby decreasing their amplitudes and their potential gradients. As a result, the protection thus afforded to the electrical apparatus connected in circuit is of a very high order. Moreover, my protective device will likewise relieve a line conductor from the strains and stresses occasioned by any surges that may originate from the switching operations. In all cases, the condensers 11 are to be connected to ground and, preferably, on the power-house side of the inductance devices 6. While the choke coils 5 are usually employed and increase somewhat the protection afforded to the electrical apparatus in circuit, my device will operate very satisfactorily without them.

In Fig. 2, I have shown my protective device connected in each line conductor 12 of a three-phase transmission system. The condensers 11 are connected to a neutral point 13 which is grounded at 14. In this case, static disturbances and lightning discharges will flow simultaneously along each of the conductors 12 and will be absorbed by the three protective devices, the operation of each being the same as that previously described in connection with Fig. 1.

In Fig. 3, I have shown a method of inserting my protective apparatus in a transmission line conductor in order to absorb and dissipate the energy of any disturbances that may occur on both sides of the arrester. In this instance, the condenser 11 is connected between a line conductor 15 and the ground 14, and is inserted intermediate the two inductive devices 6. A portion of a disturbance occurring on either side of the protective devices 4 will flow to the ground 14 through the condensers 11 and one of the protective devices 4. It may be desirable to insert a plurality of protective devices, as shown in Fig. 3, at spaced intervals in a transmission system in order to greatly increase the protection afforded the apparatus and to readily dissipate the energy of the disturbances occurring therein.

In Fig. 4, I have substituted, for the inductive device 6 of Figs. 1, 2 and 3, a series transformer 16 comprising a primary winding 17 and a secondary winding 18, these windings being loosely magnetically coupled. The condenser 11 is connected between the ground 14 and the transmission conductor 15. In this case, it will be noted, however, that the condensers 7 and 11 are not connected in series relationship by a conductor. Inasmuch as the primary and secondary windings 17 and 18 are loosely magnetically coupled, the winding 17 acts in a manner somewhat similar to that of the inductive device 6. However, the energy of high-frequency disturbances is quickly transferred to the secondary winding 18 and dissipated in the subsidiary circuit 8.

Referring to Fig. 5, the protective device 5 comprises, in addition to the elements above mentioned, a resistance element $18^a$ which is connected in shunt to the inductive device 6. In this instance, the condenser 11 is connected between the ground 14 and the subsidiary circuit 8, the condenser 7, the inductive device 6, and the resistor $18^a$. The action of the condenser 7 and the subsidiary circuit 8 is similar, in all respects, to that described in connection with the device illustrated in Fig. 1. Energy stored in the condenser 11 on discharging back into the line is afforded a path through the resistor $18^a$, in addition to the path through the inductive device 6. By reason of the resistor $18^a$, this energy is somewhat more rapidly absorbed than would otherwise be the case.

In Fig. 6, the protective device is somewhat similar to those shown in Figs. 4 and 5 taken in combination. The resistor $18^a$ is connected in shunt to the primary winding 17 of the series transformer 16. The secondary winding 18 of the transformer 16 is connected in shunt to the condenser 7 and the subsidiary circuit 8. The condenser 11 is connected between the ground 14 and the inductive device 17 and the resistor $18^a$. The resistor $18^a$, in connection with the inductive device 17, absorbs the energy discharged from the condenser 11, and, at the same time, decreases the amplitudes and the potential gradients of the disturbing waves. The condenser 7 absorbs a large portion of the energy of the disturbing waves and, subsequently, discharges it at high frequencies through the energy-consuming devices comprising the circuit 8.

The arrangement shown in Fig. 7 is a modification of the arrangement shown and described in connection with Fig. 1, the inductive device, in this instance, comprising an inductive winding 19 which is provided with adjustable taps 20. The inductive device 19 is substituted for the inductive device 6 and the choke coil 5 of Fig. 1, the condenser 7 being connected across that portion which corresponds to the inductive device 6. The action of this arrangement is similar, in all respects, to that previously described in connection with Fig. 1.

In Fig. 8, I have shown a particular combination which my experiments have proved to be effective in affording protection to electrical apparatus. The condensers 11 are connected on the power-house side between the conductors 12 of the three-phase system and the ground 14, as explained in connection with Fig. 2. The inductive devices 6 are shunted by resistance elements $18^a$ only, the high-frequency discharge circuits comprising the condensers 7 and the subsidiary circuits 8 being omitted. The condensers 11 absorb the greater portion of the disturbance that flows through the elements 6 and $18^a$. A portion of the energy stored in the condensers 11, on being redischarged into the transmission system, is forced through the devices 6 and $18^a$ and therein dissipated. The disturbing waves, persisting upon the transmission conductors, are modified substantially by reason of their decreased amplitudes and decreased potential gradients so as to be practically harmless to the electrical apparatus connected in circuit.

By referring to Fig. 9, a further modification of my protective device is illustrated. In this instance, the combination results from the structures shown in Figs. 5 and 7. A portion of the inductive device 19 is shunted by the condensers 7 and the subsidiary discharge circuit 8, the condenser 11 being connected to the ground 14 and to an intermediate tap 21 of the winding 19, the condenser 7, and the subsidiary circuit 8. All of the winding 19 is shunted by the resistor $18^a$ and is connected to the ground 14 through a third condenser 22. In this instance, the condensers 11 and 22 simultaneously absorb the energy of the disturbances which traverse the winding 19 and the resistor $18^a$. A portion of the energy thus absorbed is subsequently forced back upon the transmission system and flows through the energy-consuming devices 19 and $18^a$. The condenser 7 and subsidiary circuit 8, in this case, act as explained in connection with the other modified forms of my invention.

While I have shown and described, somewhat in detail, several embodiments of my invention, it will be apparent to those skilled in the art that many modifications may be made without departing from the spirit and scope of the appended claims.

I claim as my invention:

1. In a protective device, the combination with a line conductor, an inductive device inserted therein, a condenser connected in shunt to said inductive device, and a subsidiary circuit comprising a resistance element, and spaced spark gap members connected in shunt to said condenser, of a second condenser connected between the ground and said inductive device, said first condenser and said subsidiary circuit.

2. In a protective device, the combination with a line conductor, an inductive device inserted therein, a condenser connected in shunt to said inductive device, and a subsidiary circuit comprising spaced spark-gap members connected in shunt to said condenser, of a second condenser connected between ground and said inductive device, said first condenser and said subsidiary circuit.

3. In a protective device, the combination with a line conductor and an inductive device, a condenser and a subsidiary circuit all connected in parallel relationship and inserted in series in said line conductor, said subsidiary circuit comprising an energy-consuming device, of a second condenser connected between ground and said first condenser.

4. In a protective device, the combination with a line conductor, an inductive device inserted therein, a condenser connected in shunt to said inductive device, and a subsidiary circuit comprising spaced spark-gap members connected in shunt to said condenser, of a second condenser connected between ground and said inductive device, said first condenser and said subsidiary circuit, said secondary condenser being connected to the line conductor on the power-house side of said inductive device.

5. In a protective device, the combination with a line conductor and an inductive device, a condenser and a subsidiary circuit all connected in parallel relationship and inserted in series in said line conductor, said subsidiary circuit comprising elements having electrical constants which impart to the subsidiary circuit natural periods of vibration of extremely high frequencies, of a second condenser connected between ground and said first condenser.

6. In a protective device, the combination with a line conductor, an inductive device inserted in series therewith, a condenser and a subsidiary circuit connected in parallel relationship with each other and in shunt to a portion of said inductive device, said subsidiary circuit comprising an energy-consuming device, of a second condenser connected between ground and said line conductor.

7. In a protective device, the combination with a line conductor, an inductive device connected in series circuit therewith, a condenser and energy-consuming devices connected in parallel relationship with each other and in shunt to said inductive devices, one of said energy-consuming devices comprising a subsidiary circuit that has a natural period of vibration of high frequency, of a second condenser connected between ground and said first condenser.

8. In a protective device, the combination with a line conductor, an inductive device connected in series circuit therewith, a condenser and energy-consuming devices connected in parallel relationship with each other and in shunt to said inductive devices, one of said energy-consuming devices comprising a non-inductive resistance, and another comprising a subsidiary circuit that has a natural period of vibration of high frequency, of a second condenser connected between ground and said first condenser.

9. In a protective device, the combination with a line conductor, an inductive device connected in series circuit therewith, and energy-consuming devices connected in parallel relationship with each other and in shunt to said inductive device, of a second condenser connected between ground and said line conductor.

10. In a protective device, the combination with a line conductor, an inductive device connected in series circuit therewith, and means connected in shunt to said inductive device for effecting discharges of disturbances occurring on said line conductor through energy-consuming devices, with frequencies exceeding the initial frequencies of said disturbances, of a second condenser connected between ground and said first conductor.

11. In an electrical circuit, the combination with a plurality of parallel line conductors, protective devices inserted in each of said line conductors, each protective device comprising an inductive device connected in series with its respective line conductor, a condenser, and a subsidiary circuit connected in parallel relation with each other and in shunt to said inductive device, said subsidiary circuit comprising a resistance and spaced adjustable spark-gap members, and a second condenser inserted between ground and each line conductor.

12. In an electrical circuit, the combination with a plurality of parallel line conductors, of protective devices inserted in each of said line conductors, each protective device comprising an inductive device connected in series circuit with its respective line conductor, an energy-consuming device connected in shunt to said inductive device, and a condenser connected between each line conductor and ground.

13. In an electrical circuit, the combination with a plurality of parallel line conductors, of protective devices inserted in each of said line conductors, each protective device comprising an inductive device inserted in series with its respective line conductor, a condenser and an energy-consuming device connected in parallel relationship with each other and in shunt to said inductive device, and a second condenser connected between ground and each line conductor.

14. In a protective device, the combination with a line conductor, an inductive device connected in series circuit therewith, a condenser, and a subsidiary circuit comprising energy-consuming devices connected in parallel relationship with each other and in shunt to said inductive device, and a second condenser connected between ground and said line conductor, said second condenser being disposed on the power-house side of said inductive device.

In testimony whereof, I have hereunto subscribed my name this 27th day of March, 1915.

ALEXANDER CHERNYSHOFF.